United States Patent Office.

WILLIAM B. MYRES, OF FRENCHTOWN, NEW JERSEY.

Letters Patent No. 92,086, dated June 29, 1869.

---

IMPROVED MEDICAL COMPOUND.

---

The Schedule referred to in these Letters Patent and making part of the same.

---

*To all whom it may concern:*

Be it known that I, WILLIAM B. MYRES, of Frenchtown, in the county of Hunterdon, and State of New Jersey, have invented a new and valuable Improvement in Medical Compounds; and I do hereby declare that the following is a full, clear, and exact description of the construction and operation of the same.

I take, of flaxseed, one-fourth of a pound, (bruised;) licorice-stick, (bruised,) one ounce; sage-leaves, one-fourth ounce; hoarhound-leaves, one-fourth ounce; elecampane-root, (bruised,) one-fourth ounce; tincture of opium, one-fourth ounce; Indian physic, *(Gillenia trifoliata,)* stems and leaves, one-fourth ounce; lemon-juice, one half pint; sirup or molasses, one pint, (or white sugar, one pound;) and brandy, one pint; mix the whole, and, in a suitable metallic vessel, boil the whole until thoroughly compounded, when the mixture is ready for use.

The above compound I claim to be useful for coughs, colds, asthma, consumption, scrofula, and all eruptions of the skin.

What I claim as my invention, and desire to secure by Letters Patent, is—

The medical compound above described, compounded of the materials, of the proportions, and in the manner substantially as specified.

In testimony that I claim the above, I have hereunto subscribed my name, in the presence of two witnesses.

WILLIAM B. MYRES.

Witnesses:
   HENRY LAUX,
   ALFRED TETTEMER.